US008483112B2

(12) United States Patent
Keshavarzian et al.

(10) Patent No.: US 8,483,112 B2
(45) Date of Patent: Jul. 9, 2013

(54) METHOD FOR DATA COLLECTION AND SUPERVISION IN WIRELESS NODE NETWORKS

(75) Inventors: Abtin Keshavarzian, Palo Alto, CA (US); Huang Lee, Stanford, CA (US)

(73) Assignee: Robert Bosch GmbH, Stuttgart (DE)

( * ) Notice: Subject to any disclaimer, the term of this patent is extended or adjusted under 35 U.S.C. 154(b) by 1437 days.

(21) Appl. No.: 12/038,531

(22) Filed: Feb. 27, 2008

(65) Prior Publication Data
US 2009/0213822 A1 Aug. 27, 2009

(51) Int. Cl.
*H04H 20/71* (2008.01)
*H04W 4/00* (2009.01)
*H04L 12/28* (2006.01)

(52) U.S. Cl.
USPC ............. 370/312; 370/329; 370/390; 455/69; 455/453; 714/750; 340/539.15

(58) Field of Classification Search
USPC ................. 370/252, 328, 329, 331, 332, 335, 370/337, 342, 345, 347, 312, 390; 375/130, 375/227; 455/69.7, 449, 450, 453, 522, 63.1–69; 340/539, 870.07, 539.15; 714/748–750
See application file for complete search history.

(56) References Cited

U.S. PATENT DOCUMENTS

| 6,501,940 | B1 * | 12/2002 | Koga ........................... 455/11.1 |
| 6,810,018 | B2 * | 10/2004 | Paranchych et al. .......... 370/252 |
| 7,917,145 | B2 * | 3/2011 | Mahany et al. ............ 455/435.1 |
| 7,961,651 | B2 * | 6/2011 | Kim et al. ..................... 370/256 |
| 2002/0071419 | A1 | 6/2002 | Paranchych et al. |
| 2002/0173315 | A1 | 11/2002 | Chmaytelli et al. |
| 2005/0100029 | A1 * | 5/2005 | Das ............................... 370/401 |
| 2006/0072458 | A1 * | 4/2006 | Dougall et al. ............... 370/230 |
| 2007/0060169 | A1 * | 3/2007 | Johansson et al. ............ 455/453 |
| 2008/0084855 | A1 * | 4/2008 | Rahman ....................... 370/342 |
| 2010/0097988 | A1 * | 4/2010 | Chung et al. .................. 370/328 |
| 2010/0226335 | A1 * | 9/2010 | Sampath et al. .............. 370/329 |
| 2012/0246499 | A1 * | 9/2012 | Jessup et al. .................. 713/320 |

FOREIGN PATENT DOCUMENTS

| WO | 0215618 A1 | 2/2002 |
| WO | 2005053338 A1 | 6/2005 |
| WO | 2005055524 A1 | 6/2005 |
| WO | WO 2005/005524 A1 * | 6/2005 |

OTHER PUBLICATIONS

Tanenbaum A S ED—Tanenbaum A S: "Computer Networks ED.3", Computer Networks, London: Prentice-Hall International; GB, Jan. 1, 1996, pp. 43-44, 182, XP002967981, ISBN: 978-0-13-394248-4, p. 182, Lines 21-27.
W. Lou et al., "Performance Optimization using Multipath Routing in Mobile Ad Hoc and Wireless Sensor Networks" Combinatorial Optimization in Communication Networks, 2005, pp. 1-29, XP002521748, Kluwer Academic Publishers, whole document.

(Continued)

*Primary Examiner* — Habte Mered
(74) *Attorney, Agent, or Firm* — Keith Swedo; Taft Stettinius & Hollister LLP

(57) ABSTRACT

A wireless networking method includes providing a plurality of different sets of wireless links and a plurality of wireless nodes. The nodes are in mutual bi-directional wireless communication via the wireless links. Each of the links enables the communication between a respective pair of the nodes. Information is transmitted to a selected one of the nodes from each of other ones of the nodes via a first of the sets of the wireless links. The step of transmitting information to the selected one of the nodes from each of other ones of the nodes is repeated via each of other ones of the sets of the wireless links, respectively.

11 Claims, 17 Drawing Sheets

OTHER PUBLICATIONS

Heinzelman, Energy-efficient communication protocol for wireless microsensor networks, in Proceedings of the Hawaii International Conference on System Sciences HICSS, Jan. 2000.

Lindsey, Data gathering algorithms in sensor networks using energy metrics, IEEE Trans. Parallel Distrib. Syst., vol. 13, No. 9, pp. 924-935, 2002.

Annamalai, On tree-based convergecasting in wireless sensor networks, in Proceedings of IEEE Wireless Communications and Networking, vol. 13, 2003, pp. 1942-1947.

Upadhyayula, A low-frequency and energy-efficient algorithm for convergecast in wireless sensor networks, in Proceedings of IEEE GLOBECOM, Dec. 2003, pp. 3225-3530.

Rodoplu, Minimum energy mobile wireless networks, IEEE J-SAC, vol. 17, pp. 1333-1344, Aug. 1999.

Chang, Maximum lifetime routing in wireless sensor networks, IEEE/ACM Transactions on Networking, vol. 12, pp. 609-619, Aug. 2004.

Ganeriwal, Time-sync protocol for sensor networks, in Proceedings of ACM SenSys, Los Angeles, CA, Nov. 2003.

Boyd, Convex Optimization, Cambridge University Press, 2004.

Furer, Approximating the minimum-degree steiner tree to within one of optimal, Journal of Algorithms, vol. 17, pp. 409-423, Aug. 1994.

European Search Report, completed Mar. 31, 2009.

European Standard prEN 54-25—Fire detection and fire alarm systems—Part 25: Components using radio links.

* cited by examiner

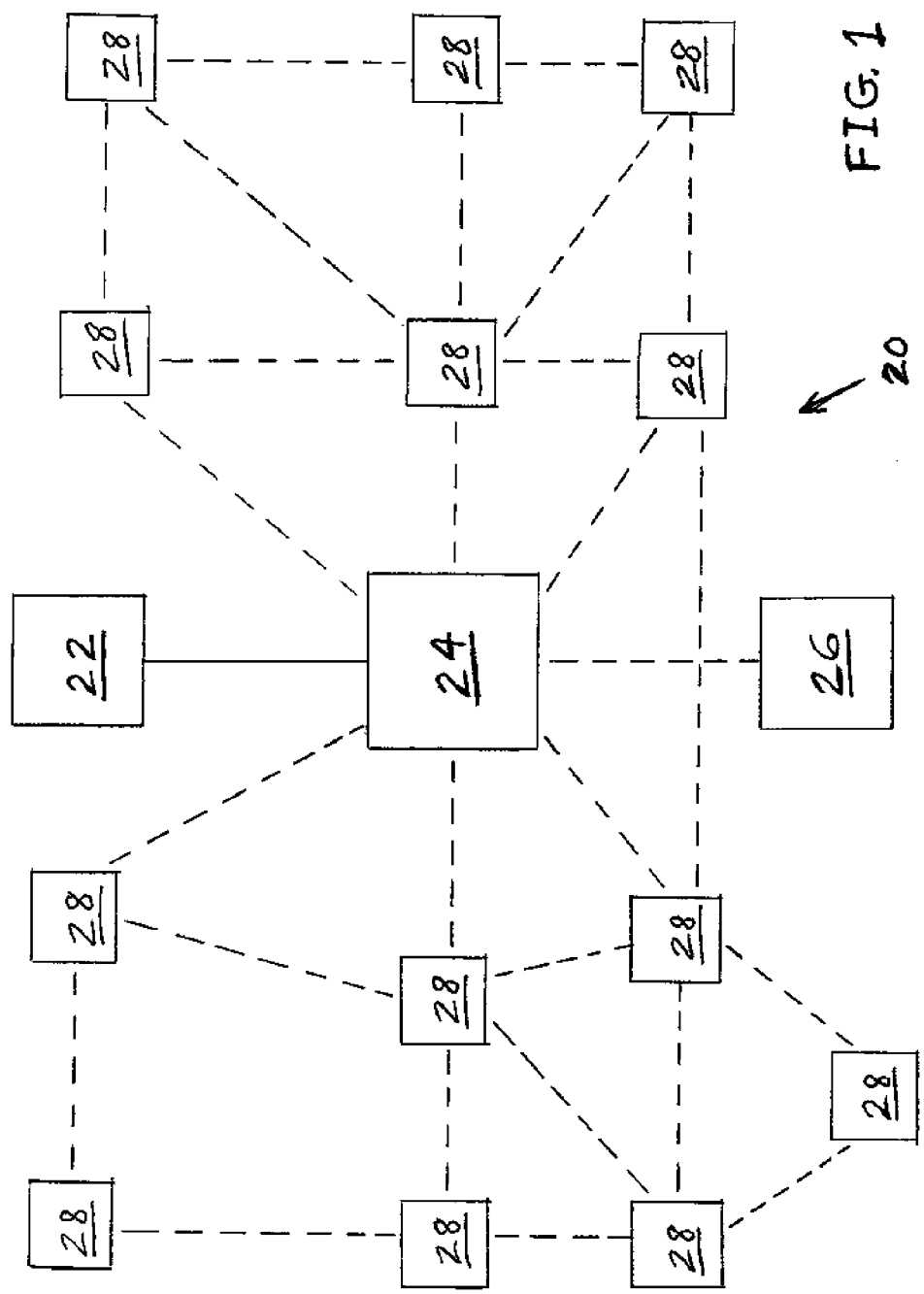

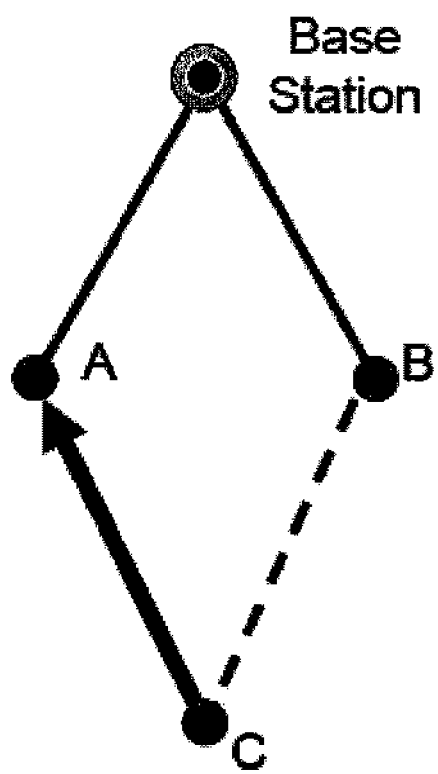 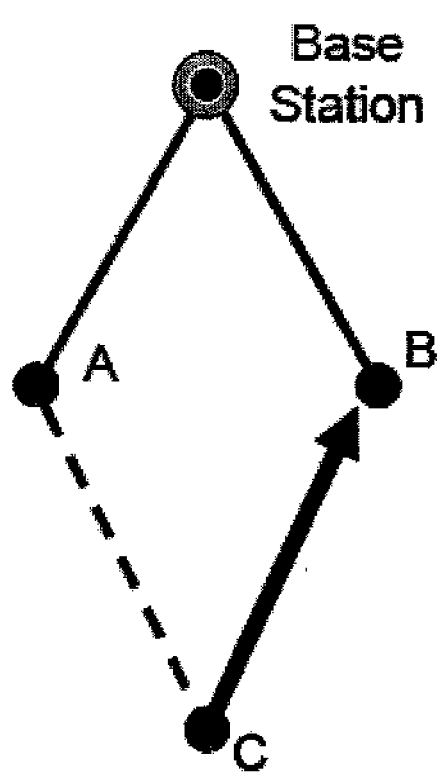
FIG. 3a                    FIG. 3b

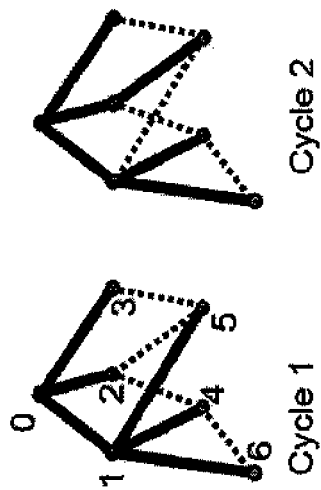
FIG. 5a Cycle 1
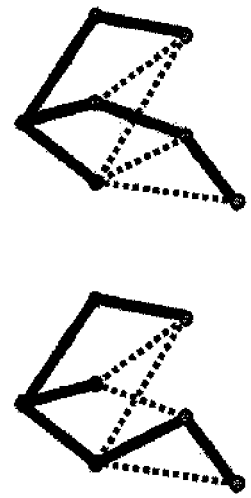
FIG. 5b Cycle 2
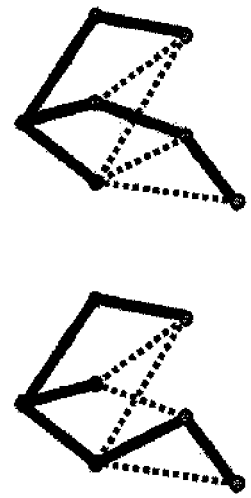
FIG. 5c Cycle 3
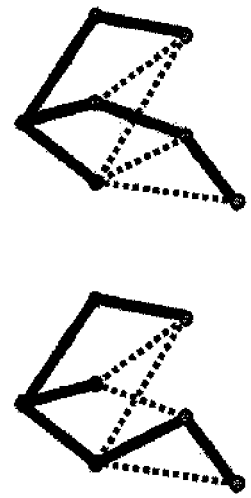
FIG. 5d Cycle 4
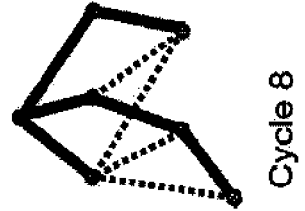
FIG. 5e Cycle 5
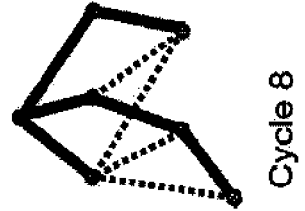
FIG. 5f Cycle 6
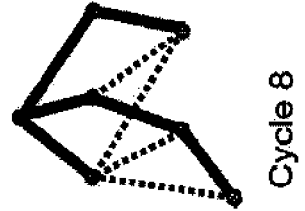
FIG. 5g Cycle 7
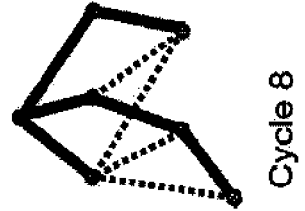
FIG. 5h Cycle 8

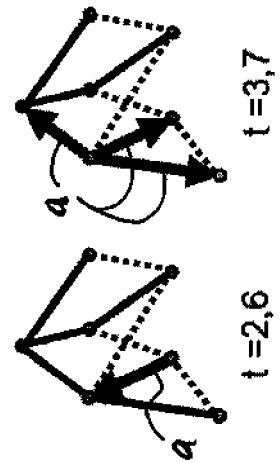
FIG. 6d  t=3,7
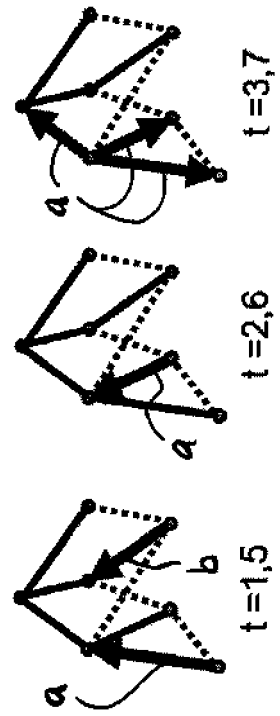
FIG. 6c  t=2,6
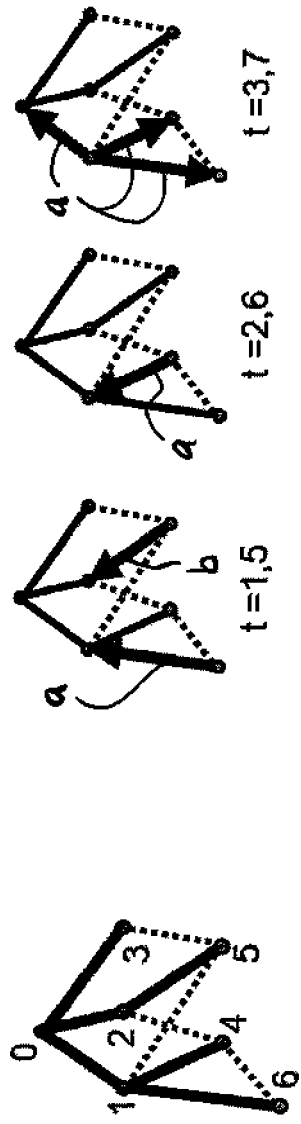
FIG. 6b  t=1,5
FIG. 6a
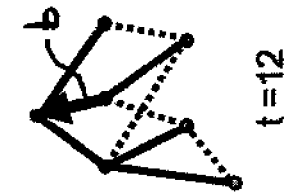
FIG. 6i  t=12
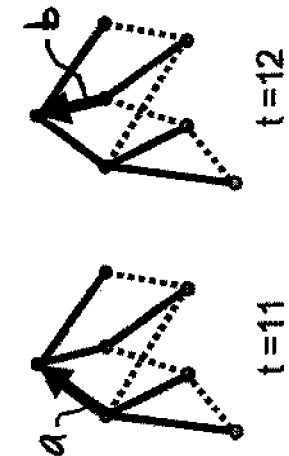
FIG. 6h  t=11
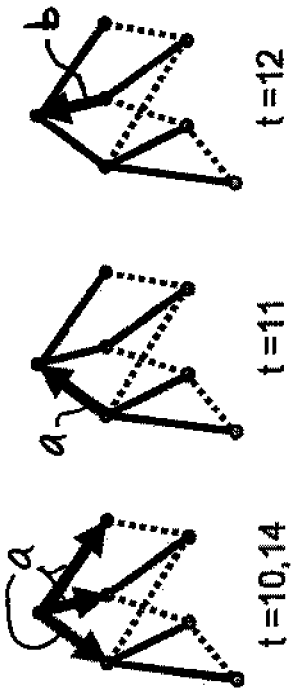
FIG. 6g  t=10,14
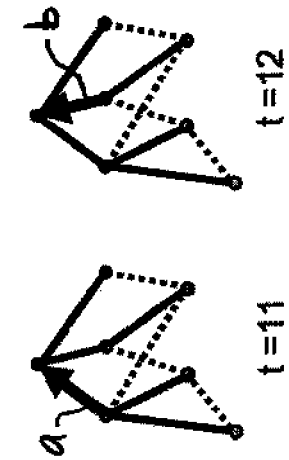
FIG. 6f  t=9,13
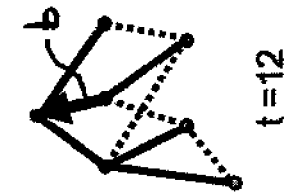
FIG. 6e  t=4,8

| Algorithm 1 Layer Assignment Procedure |
|---|
| Input: Network connectivity graph |
| Output: Layer assigned to nodes: $\mathbb{L} = (l_1, l_2, \ldots, l_N)$. |
| 1: $\mathbb{X} = (x_1, x_2, \ldots, x_N) \leftarrow 0$.  ▷ Layer Constraints |
| 2: $\mathbb{L} \leftarrow \text{FINDLAYER}(\mathbb{X})$. |
| 3: $S \leftarrow \{$ all nodes $n$ with $l_n \geq 2\}$. |
| 4: repeat |
| 5:     $z_{\min} \leftarrow \infty$     ▷ Min number of parents |
| 6:     for each node $n \in S$ do |
| 7:        $P_n \leftarrow \{$ all nodes $p$ connected to $n$ and $l_p < l_n\}$. |
| 8:        if $z_{\min} <$ number of elements in $P_n$ then |
| 9:           $z_{\min} \leftarrow$ number of elements in $P_n$. |
| 10:           $n_{\min} \leftarrow n$.    ▷ The node with least parents |
| 11:     $\mathbb{L}_{old} \leftarrow \mathbb{L}, \mathbb{X}_{old} \leftarrow \mathbb{X}$. |
| 12:     $x_{n_{\min}} \leftarrow l_{n_{\min}} + 1$.    ▷ Push $n_{\min}$ to higher layer |
| 13:     $\mathbb{L} \leftarrow \text{FINDLAYER}(\mathbb{X})$. |
| 14:     $P \leftarrow \{$ all nodes $p$ connected to $n_{\min}$ with $l_p < l_{n_{\min}}\}$. |
| 15:     $z \leftarrow$ number of elements in $P$. |
| 16:     if $(z > z_{\min})$ then    ▷ if $n_{\min}$ has more parents |
| 17:        $S \leftarrow \{$ all nodes $n$ with $l_n \geq 2\}$. |
| 18:     else    ▷ no change in no. of parents |
| 19:        Remove $n_{\min}$ from $S$, $\mathbb{L} \leftarrow \mathbb{L}_{old}$, $\mathbb{X} \leftarrow \mathbb{X}_{old}$. |
| 20: until $S$ is empty. |
| 21: Return $\mathbb{L}$. |
| 22: |
| 23: function FINDLAYER($\mathbb{X}$) |
| 24:     Input: Layer constraint $\mathbb{X} = (x_1, x_2, \ldots, x_N)$, |
| 25:     Output: Layer assignments: $\mathbb{L} = (l_1, \ldots, l_N)$. |
| 26:     $U \leftarrow \{$ all nodes in the network $\}$. |
| 27:     Assign layer 0 to base station and remove it from $U$. |
| 28:     $k \leftarrow 0$. |
| 29:     while $U$ is not empty do |
| 30:        $k \leftarrow k + 1$. |
| 31:        $\overline{U} \leftarrow \{$ all nodes $\} - U$. |
| 32:        $W \leftarrow U \cap \{$ all nodes $n$ with $x_n \leq k\}$. |
| 33:        for all $j \in W$ do |
| 34:           if $j$ has a link to any node in $\overline{U}$ then |
| 35:              Assign layer $k$ to node $j$ $(l_j \leftarrow k)$, |
| 36:              Remove node $j$ from $U$, (no change to $\overline{U}$). |

FIG. 7

Algorithm 2 Flow Quantization

Input : Flow rates $\{f_{nj}\}$ and number of trees $M$
Output: Link/parent usage $\{u_{nj}\}$
1: $u_{nj} \leftarrow [Mf_{nj}]$.     ▷ $[x]$ rounds $x$ to the closet integer.
2: while $(\sum_{j \in P_n} u_{nj}) \neq M$ do
3:     Compute $d_j \leftarrow (u_{nj} - Mf_{nj}) \quad \forall j \in P_n$.
4:     if $(\sum_{j \in P_n} u_{nj}) > M$ then
5:         Find $k \leftarrow \arg\max_{j \in P_n} (d_j)$.
6:         $u_{nk} \leftarrow u_{nk} - 1$.
7:     else
8:         Find $k \leftarrow \arg\min_{j \in P_n} (d_j)$.
9:         $u_{nk} \leftarrow u_{nk} + 1$.

FIG. 8

TABLE I
A 6×8 TREE TABLE.

| Node | Parent node in cycle/tree 1 to 8 | | | | | | | |
|---|---|---|---|---|---|---|---|---|
| | 1 | 2 | 3 | 4 | 5 | 6 | 7 | 8 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 1 | 1 | 1 | 2 | 2 | 2 | 2 | 2 |
| 5 | 1 | 2 | 3 | 3 | 3 | 3 | 3 | 3 |
| 6 | 1 | 1 | 4 | 4 | 4 | 4 | 4 | 4 |

FIG. 9

METHOD FOR DATA COLLECTION AND SUPERVISION IN WIRELESS NODE NETWORKS

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright© 2008, Robert Bosch GmbH, All Rights Reserved.

BACKGROUND OF THE INVENTION

1. Field of the Invention

The present invention relates to networking systems, and, more particularly, to wireless networking systems.

2. Description of the Related Art

Wireless sensor networks provide efficient solutions for many new or existing applications in building technology, industry, and the military. Security systems for intrusion detection, fire alarm systems, HVAC climate control systems, and environmental monitoring systems are some of the practical applications of wireless sensor networks.

The main motivations for the use of wireless sensor networks are to reduce the installation and maintenance costs, increase deployment flexibility, and enable the installation process to be as unobtrusive as possible. The advent of wireless solutions has been fueled by advances in low cost and low power radio transceivers as most envisioned systems are battery operated and expected to be successful only if they are low in cost.

In wireless sensor networks, periodic data collection or node supervision is utilized in many applications. During the data collection process, messages from the wireless nodes in the network are periodically collected and sent back to a central controller, such as a base station, for further processing. The content of the messages may be sensor readings or any other low-priority data, for example. Node supervision, which is especially important in security systems, is the process of periodic functional checks of every node in the network. Thus, in the node supervision process, the content of the messages may be acknowledgements from the sensor nodes indicating that all nodes are still operating.

Wireless systems pose a new set of protocol design challenges as the network's useful lifetime before failure and the network's reliability become two important design factors. The sensor nodes in the system are typically small and battery-operated, and are required to live for years before failure. Therefore, energy-efficiency is a crucial factor in all the tasks performed throughout the network's lifetime. Ensuring reliability is an important element of a wireless system, since wireless as a physical medium of communication is more prone to errors than its wired counterpart.

A particular problem with battery-operated wireless systems is that one node may be utilized to a greater extent than the other nodes. Thus, the node that is utilized to a greater extent may exhaust its battery power and fail prematurely, thereby reducing the useful lifetime of the entire system before service is required.

What is neither disclosed nor suggested by the prior art is an arrangement for a wireless network that evens out the battery usage among the various nodes, thereby increasing the useful lifetime of the entire system before service is required.

SUMMARY OF THE INVENTION

The present invention may provide a wireless network arrangement in which communication functions such as signal reception and signal transmission are spread out among the various nodes, thereby reducing the likelihood that any one of the nodes will be overburdened and will fail prematurely.

The present invention may address the problem of supervision or periodic data collection for stationary wireless sensor networks and may provide a practical, energy-efficient, and reliable solution. Energy-efficiency may be achieved by combining three design methods: (1) Adopting network flow optimization techniques. An improved scheme for balancing the communication load among all the nodes in the network may be calculated. An optimal such balancing scheme may provide a lower bound for the energy required for the data collection process. (2) Instead of using a fixed network topology, i.e., a fixed communication tree, a set of optimized communication trees may be constructed. Different ones of the optimized communication trees are used over different data collection cycles. This method of using a variety of different communication trees may achieve an average energy consumption rate that is very close to the optimal value for the average energy consumption rate. (3) The packet exchange procedure may be designed based on collision-free schedules, thereby reducing the number of packets and the transmission and reception times for each node. The reliability of the process may be improved by including many re-transmission opportunities in the schedules. The proposed solution may be analyzed and its performance evaluated through simulations.

The invention comprises, in one form thereof, a wireless networking method including providing a plurality of different sets of wireless links and a plurality of wireless nodes. The nodes are in mutual bi-directional wireless communication via the wireless links. Each of the links enables the communication between a respective pair of the nodes. Information is transmitted to a selected one of the nodes from each of other ones of the nodes via a first of the sets of the wireless links. The step of transmitting information to the selected one of the nodes from each of other ones of the nodes is repeated via each of other ones of the sets of the wireless links, respectively.

The invention comprises, in another form thereof, a wireless networking method including providing a plurality of wireless nodes having a grandparent node, a plurality of parent nodes, and a plurality of child nodes. Each of the parent nodes transmits wireless communication to the grandparent node. Each of the child nodes transmits wireless communication to a respective subset of the parent nodes. For each of the child nodes, a fraction of the child node's communication to transmit to each of the parent nodes in the child node's respective subset is calculated such that each of the plurality of parent nodes receives a substantially equal distribution of the transmissions from the plurality of child nodes. The wireless communication is transmitted from the child nodes to the parent nodes according to the calculated fractions such that each of the plurality of parent nodes receives a substantially equal distribution of the transmissions from the plurality of child nodes.

The invention comprises, in yet another form thereof, a wireless networking method including providing a plurality of wireless nodes having a grandparent node, a parent node, and a child node. A first signal is transmitted from the child node to the parent node. The first signal includes information. The parent node is used to transmit, in response to the parent node receiving the first signal, a second signal to each of the grandparent node and the child node. The second signal includes the information. Reception of the second signal at the child node is treated as an acknowledgement to the child node that the first signal was received by the parent node.

An advantage of the present invention is that it provides a practical wireless network arrangement that is reliable and energy-efficient.

Another advantage of present invention is that it extends the useful lifetime of a wireless network arrangement before the arrangement requires servicing.

Yet another advantage of the wireless network arrangement of the present invention is that there is no requirement that all nodes have power control or the ability to transmit data to all other nodes in the network.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a block diagram of one embodiment of a wireless network arrangement of the present invention.

FIG. 2b is a schematic diagram of a second step of the packet exchange procedure of FIG. 2a.

FIG. 3a is a schematic diagram of a first tree configuration for a simple network of the present invention.

FIG. 3b is a schematic diagram of a second tree configuration for a simple network of the present invention.

FIGS. 5a-h is a set of network trees which collectively use each parent on average based on the optimal link usage values of FIG. 4d according to one embodiment of a method of the present invention.

FIGS. 6a-i are schematic diagrams illustrating collision-free scheduling for the network tree of FIG. 5a according to one embodiment of a method of the present invention.

FIG. 7 is a computer programming listing of a layer assignment algorithm according to one embodiment of a method of the present invention.

FIG. 8 is a computer programming listing of an algorithm for calculating the number of usages for each node according to one embodiment of a method of the present invention.

FIG. 9 is one embodiment of a tree table that may be used to create the set of network trees of FIGS. 5a-h according to a method of the present invention.

Figure 2A:
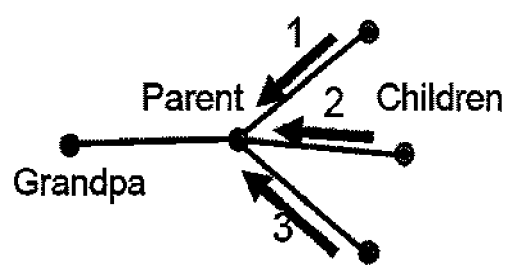
FIG. 2a is a schematic diagram of a first step of one embodiment of a packet exchange procedure according to one embodiment of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may be described herein in terms of algorithms and operations on data bits within a computer. It has proven convenient, primarily for reasons of common usage among those skilled in the art, to describe the invention in terms of algorithms and operations on data bits. It is to be understood, however, that these and similar terms are to be associated with appropriate physical elements, and are merely convenient labels applied to these physical elements. Unless otherwise stated herein, or apparent from the description, terms such as "calculating", "determining", "processing" or "computing", or similar terms, refer the actions of a computing device that may perform these actions automatically, i.e., without human intervention, after being programmed to do so.

Referring now to the drawings and particularly to FIG. 1, there is shown one embodiment of a wireless network arrangement 20 of the present invention in the form of an intrusion detection security system. In a particular embodiment, arrangement 20 is in the form of a multiple-point alarm system. Instead of employing wires and cables, arrangement 20 utilizes two-way wireless transmissions to communicate. As illustrated, arrangement 20 includes an intrusion control panel 22 having a keypad, a radio frequency hub or base station 24, a wireless keypad 26, and a plurality of nodes 28. Nodes 28 may include key fobs, sirens, output modules and wireless detectors, such as motion detectors, smoke detectors, door/window contacts, etc. The remote devices in the network such as wireless keypad 26 and nodes 28 may be battery powered and may each include a transceiver module that has a radio and a microprocessor. In addition to having wireless transmitters and/or receivers, nodes 28 may include for producing information to be included in the content of the wireless communication. Nodes 28 may also include actuators, for using or acting upon information carried in the received communication signals. As indicated in FIG. 1, nodes 28 may be wirelessly and communicatively coupled to each other via wireless links 30, along with hub 24. Specifically, each of nodes 28 and hub 24 may be capable of engaging in two-way wireless communication with at least one of the other nodes 28 or hub 24. The number of other nodes 28 or hub 24 that a particular node 28 may communicate with may be limited by distances between the nodes or by hindrances that may block the communication paths between the nodes. In a particular embodiment, nodes 28 and hub 24 communicate in the radio frequency spectrum. However, it is also possible within the scope of the invention for nodes 28 and hub 24 to communicate via any other wireless means, such as sounds, optics, microwaves and/or infra-red signals, for example.

Any of nodes 28 may be a producer and/or a user of the information carried in the signals communicated amongst nodes 28 and hub 24. However, some of nodes 28 may be intermediate nodes in the sense that an intermediate node 28 neither produces nor uses the communicated information. That is, an intermediate node 28 may be configured exclusively to relay wireless signals between others of nodes 28 or hub 24.

Wireless network arrangement 20 may perform periodic supervision of remote nodes 28. The supervision may be in the form of a regular functional check of every node in the network. By the end of one supervision cycle, base station 24 may verify that all nodes 28 in the network 20 are still functional by receiving a supervision message from each node 28. If hub 24 does not receive a supervision message from a node, perhaps after more than one retry, an alarm signal may be transmitted and the user may be informed. The supervision time period may be determined by the regulatory requirement based on the application and the required security grade. For example, fire alarm systems specify a supervision period of 300 seconds (EN54-25 [1]), while for a grade three intrusion detection system the supervision period is 120 seconds (EN 50131-5 [2]). In addition to the functional check of each node 28, supervision can be used to collect low-priority data such as battery level, the sensor measurements, or the wireless link quality, e.g., signal-to-noise ratio/noise level) from sensor nodes 28.

The present invention provides a practical method for data collection and supervision for energy-limited wireless sensor networks. Energy-efficiency and reliability may both be improved by the present invention. The present invention may be particularly applicable in applications in which most of the nodes are stationary, but the invention is not limited to stationary nodes. In addition, there may be stringent requirements for the network's durability or lifetime that may cause a centralized approach to be employed rather than a distributed approach.

A high level of energy-efficiency may be achieved by the present invention by any of three methods, or by any combination of any two or all three of the methods. In a first such method, an energy-optimal scheme for distributing the communication load among all the nodes in the network may be calculated using network flow optimization techniques. This can provide the lower bound for the power required for the data collection process, and may determine the duration of the network lifetime.

In a second of the three methods, instead of using a fixed network topology, i.e., communication tree, a set of trees are constructed, and in each data collection cycle a different one of the trees is used. By this method, an average energy consumption rate very close to the optimal case may be achieved.

In a third of the three methods, collision-free schedules are calculated for the packet exchange procedure, and the acknowledgement mechanism is optimized to minimize the number of packets and the transmission and reception times for each node. Reliability of the process may be improved by including many re-transmission opportunities in the schedules.

The network configuration, i.e., the connectivity graph, may be known by base station 24. Each sensor node 28 in network 20 may be represented by a node 28 in the graph, and dashed lines in the graph correspond to the wireless links. The connectivity graph may show only the usable links in the network. That is, only the links of good quality, i.e., that have a high signal-to-noise ratio, which can be used for communication in both directions are included in the connectivity graph.

The connectivity graph may be discovered during network initialization after installation. During the network operation there may be occasional updates to account for major changes in the network configuration. Two static nodes connected via a reliable link, i.e., a link with a high signal to noise ratio, rarely experience a complete change in their connectivity. It may be assumed that the sensor network deployment is dense enough such that every node has a few neighbors with highly reliable links. In such a network, if only reliable links are used for communication, the connectivity graph may not be subject to frequent changes. Therefore, it may be assumed that a connectivity graph formed by using the reliable links of the network is stationary.

Data collection or supervision is a periodic task in the system. Each time cycle may be divided into many time slots, wherein each time slot is long enough for one packet transmission. In order to define the time slots, a network-wide time synchronization protocol may be required to maintain a consistent notion of time among various nodes in the network.

Base station 24, which may be considered to be the central node in the network system, may be AC-powered and may have the computational capacity that is required to handle all the necessary calculations. In contrast, the regular nodes 28 in the network may not have much computational power. The regular nodes 28 may be provided with a pre-calculated set of rules and schedules that nodes 28 may simply follow. Each node in the network may be provided with a schedule list that determines how the node contributes to the overall data collection process. The schedule for a node may specify in which time slots and in which frequency channels the node should send or receive signals and who the intended receivers or senders are.

There are two main advantages of using a centralized network instead of a distributed network. First, the base station can calculate very efficient and near-optimal schedules, so the best possible performance can be achieved. Second, the sensor nodes require less memory and computational power, which consequently reduces the cost per node.

The end of the network lifetime may be defined as the time of the first death of a node in the network, e.g., a first instance of a node in the network exhausting its battery power. In order to calculate the lifetime, the average energy consumption rate of the nodes is needed. For instance, the energy consumed by each node during one data collection cycle may be needed.

To each node in the network, another node may be assigned as its parent. The parent node may be responsible for supervising its child node and collecting the child node's data. The parent/child assignment creates a network tree. The nodes may exchange packets with their children and with their parent according to a pre-calculated schedule. The parent node may collect all the messages from its children and may confirm to each child that its message is received by sending an acknowledgment packet to the child. The parent node may then aggregate all the collected data and send the aggregated data to the parent node's own parent node. The parent node may then look for and expect an acknowledgment packet to be sent back by its own parent node.

The energy consumption of a node during the course of one cycle may depend upon two factors. First, how the node communicates with its assigned children and parent. This may depend upon the size of the messages, the communication data rate, the acknowledgment mechanism, and how the messages are sent and processed. The second factor is the number of children assigned to the node. This number may depend upon how the network tree is formed and how the parent/child pairs are assigned. The two factors described above may be independently optimized. As described below, the present invention includes methods of combining the acknowledgments in order to reduce the number of exchanged packets, and methods of minimizing the average number of children.

Consider a node having Nc number of children. In a first scheme of the present invention, it is assumed that the node sends a separate acknowledgment to each child. Then, in an ideal case where there is no packet loss, the node receives Nc packets, one from each child; sends Nc acknowledgement packets, one to each child; sends one packet to its parent; and receives one acknowledgement packet from its parent.

In a second scheme of the present invention, advantage is taken of the fact that in wireless systems a broadcasted signal can be received by all the nodes in the communication range. So, instead of sending individual acknowledgment packets, the node sends one combined (possibly longer) acknowledgement packet to all the children after collecting their packets. In this case, the node receives Nc packets, one from each child; sends one combined acknowledgement packet to all children; sends one packet to its parent; and receives one combined acknowledgement packet from its parent. The acknowledgement packet may contain a bit-set pattern that indicates which child needs to retransmit because a packet was lost.

Figure 2B:
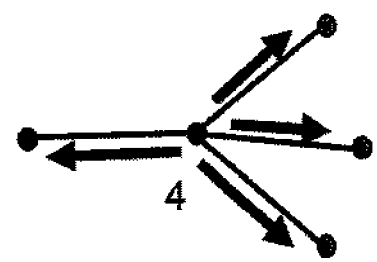

In a third scheme of the present invention, the acknowledgment packet sent to the children is further combined with the packet that the parent node sends to its parent. If the children nodes see that their parent node is sending the data to their grandparent node, the children nodes treat the message as an acknowledgment. In the ideal no packet-loss case, the parent node receives Nc packets, one from each child node, as illustrated in FIG. 2a; sends a combined packet to all children nodes and the grandparent node, as illustrated in FIG. 2b; and receives one combined acknowledgment from its parent node, i.e., the grandparent node. Thus, FIGS. 2a and 2b illustrate an example of a packet exchange procedure in which, after receiving messages from each child node, the parent node sends a combined acknowledgement packet to all its children nodes while at the same time sending its own message to the grandparent node. This third scheme is typically the most energy-efficient packet exchange procedure.

The remainder of the description of the present invention hereinbelow focuses on the third scheme described above. However, it is to be understood that the present invention may also be applied to the first two schemes described above or to any other packet exchange procedure.

Regardless of which packet exchange scheme is employed, the energy consumed by a node may include two terms. A first term is directly proportional to the number of children nodes, and a second term is a constant term related to the packet exchange between the parent node and the grandparent node. Thus, the energy consumed by a node may be modeled in general form as follows:

$$E_{node} = k_1 N_C + k_2.$$

wherein k1 and k2 are two constants related to packet length, transmission and reception power consumption of the radio, and the acknowledgement mechanism.

The calculation of the duration of system lifetime may depend upon the average energy consumption rate. Thus, in order to add packet loss and re-transmission effect to the energy model, each of terms k1, k2 may be adjusted by multiplying the term by the average number of re-transmissions required based on the quality of the links. Note that the energy model embodied in the above equation is still valid because only the values of constants k1 and k2 change as a result of the adjustment for packet loss and re-transmission effect.

In the energy model it is assumed that the packet sizes and link qualities remain almost unchanged across different nodes, so the same constants k1, k2 may be used for all nodes. This assumption may be valid for the network supervision or when the nodes are capable of performing full data aggregation during the data collection process, which may keep the packet sizes constant. However, the present invention may be extended to cases in which there is no data aggregation.

It may be desirable to minimize or reduce the average number of children nodes because if more children are assigned to a node, the node's energy consumption rate may increase proportionally. The end of the lifetime of the network may be defined as the time at which the first node in the network dies, e.g., runs out of battery power. Hence, the lifetime of the network may be limited by the lifetime of the node that has the maximum number of children nodes, and thus dies first because of the increased load placed on the nodes as a consequence of having the maximum number of children nodes.

The present invention balances the number of children nodes assigned to each node by changing the network tree over time. FIGS. 3a and 3b illustrate an example of two trees for a simple network wherein child node C can select node A or node B as its parent node. The simple example shown in FIGS. 3a and 3b may illustrate how the number of children nodes assigned to each node may be balanced by changing the network tree over time. Specifically, either node A or node B may be selected as the parent node of node C. If a single, fixed tree is used, and either the tree of FIG. 3a or the tree of FIG. 3b is selected as the single, fixed tree, then either node A or node B, respectively, will have one full-time child node in the form of node C. Moreover, the selected one of nodes A and B will become the first node to exhaust its battery and die, assuming that the base station is AC-powered and thus is not subject to exhausting its available energy. However, if the network tree is changed over data collection cycles and the two trees of FIGS. 3a and 3b are alternatingly used as the network tree, then the load of node C is distributed evenly between its two parents, i.e., nodes A and B. Equivalently, it may be said that node A and node B each has, on average, half of a child node. Due to neither node A nor node B bearing more than half the burden of child node C, the network lifetime is significantly increased. While the example illustrated in FIGS. 3a and 3b is trivial, evenly distributing the burden in a larger network tree is not as simple.

Figures 4A, 4B, 4C, 4D:
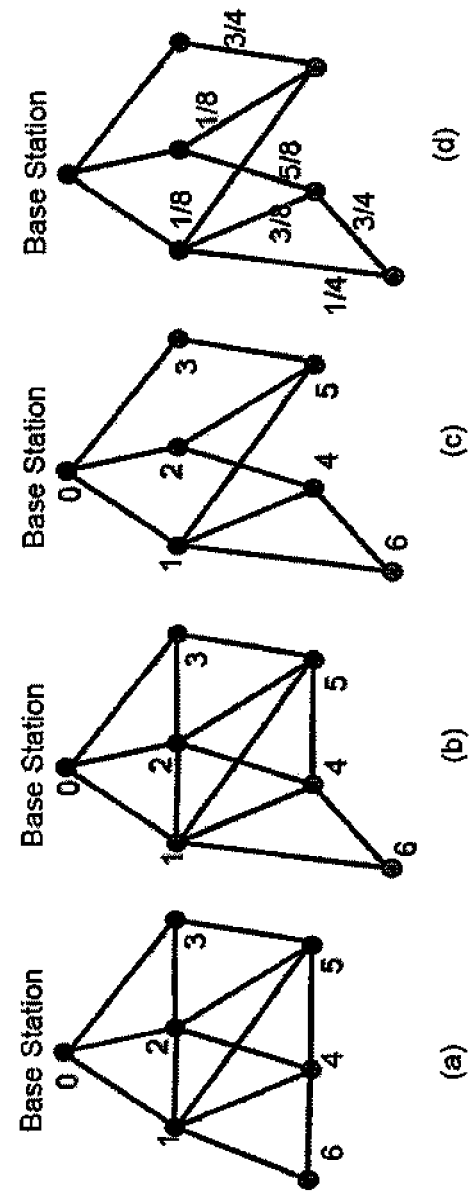
FIG. 4a is one embodiment of a network connectivity graph according to one embodiment of a method of the present invention.
FIG. 4b is the network connectivity graph of FIG. 4a after layer assignments according to one embodiment of a method of the present invention.
FIG. 4c is one embodiment of a parent graph according to one embodiment of a method of the present invention.
FIG. 4d is the parent graph of FIG. 4c illustrating optimal link usage percentages according to one embodiment of a method of the present invention.

A connectivity graph of a network is illustrated in FIG. 4a including a base station 0 and nodes 1-6. Nodes 1-3 are capable of direct two-way communication with the base station and they use the base station as their parent node. In a first step, a layer is assigned to each node to create a hierarchy in the network. For a given node at a particular layer, only nodes at lower numbered layers can be selected as the given node's parents. The base station may be assigned to layer zero and nodes 1-3 that are connected to the base station may be assigned to layer one. An algorithm of the present invention may then begin assigning layers in the breadth-first order, i.e., finding the lowest numbered layer for each node. Afterward, some of the nodes may be moved to higher numbered layers such that the number of potential parents for all nodes in the network is maximized.

FIG. 4b illustrates the same connectivity graph after layer assignment. Specifically, node 6 has been assigned to layer 3. In the connectivity graph of FIG. 4a, node 6 has only node 1 as a potential parent, but after node 6 is moved to layer three, node 6 can select node 4 in addition to node 1 as its parent. After the layer assignment, all the links between nodes in the same layer are removed to create the parent graph, which is shown in FIG. 4c. Thus, a child node, such as node 6 may transmit wireless communication to a respective subset of other ones of the child nodes, i.e., the subset in this case being node 4.

In the next step of flow calculation, the algorithm may determine the optimum percentage of time that each parent node should be used in order to achieve a balance in the overall communication load. As described hereinbelow, the calculation procedure can be formulated as a linear programming (LP) optimization problem. The optimum values of the link usage percentages for the example network are shown in FIG. 4d. For example, node 5 has three possible parents, i.e., nodes 1, 2, and 3, and the optimum assignment is to select them respectively based on the following distribution: (⅛, ⅛, ¾). That is, node 5 may use node 1 as its parent node ⅛ of the time, node 2 as its parent node ⅛ of the time, and node 3 as its parent node the remaining ¾ of the time.

The algorithm of the present invention may construct a set of trees based on the usage percentages obtained in the previous step illustrated in FIG. 4d. Each tree may be used in one data collection, i.e., supervision, cycle. The trees may be formed such that the average use of each link/parent is close to the optimal distribution determined from the flow calculation step.

FIGS. 5a-h illustrate a set of eight trees that may be constructed for the example network of FIGS. 4a-d. As is evident in FIGS. 5a-h, each network tree may be formed of a respective set of wireless links. The set of eight trees may use each parent node on average based on the optimal link usage values. Specifically, node 1 may be assigned as the parent node of node 6 in the first two trees illustrated in FIGS. 5a-b, and node 4 may be assigned as the parent node of node 6 in the remaining six trees illustrated in FIGS. 5c-h. Thus, node 1 is used as the parent node in two of eight trees, and node 4 is used as the parent node in six of eight trees, which matches the (¼, ¾) distribution from the flow calculation shown in FIG. 4d.

Considering the average number of children nodes of each parent node over all cycles, it can be seen that nodes 1, 2, and 3 each have ¾ of a child. For example, node 1 has three children nodes in the first cycle, two children nodes in the second cycle, one child node in the third cycle, and no child node in the rest of the cycles 4-8. Thus, the average value of the number of children nodes of node 1 is (3+2+1+0+0+0+0+0)/8=¾.

If the network were to use only one data collection tree and not change the tree over time, even in the most balanced tree there would be at least one node with one full-time child. Consequently, the maximum number of children over all nodes would be at least one. However, by forming multiple trees and switching the tree being used over each data collection cycle, the maximum number of children can be reduced to a value that is less than one. For example, in the example illustrated in FIG. 4d, each of parent nodes 1-3 has ¾ child node on average. The energy consumption rate of the data collection process and the network lifetime may be limited by the maximum number of children.

In the final step, the algorithm calculates a collision-free time schedule for data transmission over each tree. The schedule determines the order in which the nodes send or receive messages to and/or from their children or parent nodes and the frequency channels that are used for each transmission. The schedule may be constructed such that each node gets multiple opportunities for re-transmissions.

An example of scheduling for the first tree of FIG. 5a is shown in FIGS. 6a-i. For each tree from FIGS. 5a-h, such collision-free scheduling may be calculated. The communication tree is illustrated in FIG. 6a. The arrows in FIGS. 6b-i indicate which nodes send and receive at each time slot and the letters correspond to different frequency channels. In the time slots t=1, 2, the first layer parent nodes collect messages from second and third layer nodes. Next, in time slots t=3, 4, the parent nodes send a combined acknowledgment message to all the children nodes, while at the same time the base station listens to the same transmission to receive the message content. In time slots t=5, 6, 7, 8 the same schedules are repeated as in time slots t=1, 2, 3, 4. These time slots t=5, 6, 7, 8 may be reserved for the re-transmission of the messages in case a packet is lost in the first round. In this example of FIGS. 6a-i, only two rounds of transmissions are considered, but this can be easily increased to any number of retries. The next time slots t≧9 may be assigned to the collection of messages from the first layer nodes and their corresponding retries.

The steps of the algorithm of the present invention will now be described in more detail. The initial step of the algorithm may be to assign a layer to each node such that the number of parent nodes for all nodes is maximized. Algorithm 1, which is listed in FIG. 7, describes one specific example of the layer assignment procedure. Initially, the algorithm assigns the minimum possible layer number to each node. Next, the algorithm finds the number of potential parent nodes for all the nodes in layer two or higher. First layer nodes do not need to be considered as they can directly talk to the base station and will select the base station as their parent node. Potential parents of a node n at layer l are the nodes in lower layers (layer <l) that are connected to, i.e., share a communication link of good quality with, the node n. The algorithm finds the node with the minimum number of parents and forces that node to go to a higher numbered layer by putting a constraint on the node. The function L=FindLayer(X) calculates the layers of all nodes given a constraint vector, X, on the minimum numbered layer that can be assigned to each node. The algorithm stops when no more improvement is possible.

After the layer assignment, the parent and children sets ($P_n$, $C_n$) for each node are defined. The set of the potential parents of node n is denoted by $P_n$, and $C_n$ is defined as the set of nodes that can select node n as their parent.

The flow optimization process will now be described in detail. Based on the parent graph obtained in the last step, the optimal flow rates that minimize the maximum energy consumption among all the nodes are calculated. The flow variables $f_{np}$ between nodes n and p are defined where node p is a potential parent of node n, i.e., p is in $P_n$. The variable $f_{np}$ shows the amount of data flow or, equivalently, percentage of time, that node n uses its parent p.

The following equation describes flow conservation where $s_n$ denotes the amount of flow and/or data generated by node n and r shows the aggregation ratio.

$$\sum_{p \in P_n} f_{np} = s_n + r \sum_{c \in C_n} f_{cn},$$

The above equation provides that the amount of flow coming out of a node is equal to what is generated by the node added to the total incoming flow after aggregation and pre-processing.

For network supervision, it can be assumed that the generated flow is constant for all nodes, i.e., $s_n=1$. Also, the parent nodes can fully aggregate the collected data, so r is equal to zero. So, for the supervision/full aggregation problem, the flow conservation equation becomes $$\sum_{p \in P_n} f_{np} = 1.$$

Energy consumed by a node is related to the amount of incoming flow from its children nodes. The energy model provides $$E_n = k_1 \left( \sum_{c \in C_n} f_{cn} \right) + k_2,$$

where $(\Sigma_{c \in C_n} f_{cn})$ shows the average number of children of node n.

In order to maximize the network lifetime, the flow rates may be computed to minimize the maximum energy consumption among all the nodes:

$$\text{minimize} \max_n (E_n)$$

This problem can be formulated as the following convex optimization problem $$\begin{cases} \text{minimize} & f_{\max} \\ \text{subject to} & \left( \sum_{c \in C_n} f_{cn} \right) \le f_{\max}, \quad \forall n, \\ & \left( \sum_{p \in P_n} f_{np} \right) = 1 \quad \forall n, \\ & f_{ij} \ge 0 \quad \forall i, j. \end{cases}$$

The variables are $f_{ij}$ and $f_{\max}$ where $f_{\max}$ is the maximum incoming flow or, equivalently, the maximum number of children assigned to a node. This is a LP problem, hence it can be easily solved by any LP-solver.

The tree formation process will now be described in detail. A set of trees may be constructed that uses each parent on average based on the optimum flow rates calculated in the previous step. Let M denote the total number of trees. In order to construct the trees, the first step is to find the number of usages $u_{np}$ between a node n and its parents p in $P_n$, such that during the total M data transmission cycles the average usages $$\left( \frac{u_{np}}{M} \right)$$

is close to the optimal flow rate $f_{np}$. Given the value of M and flow rates $f_{np}$, the number of usages $u_{np}$ may be calculated for each node n using Algorithm 2, which is listed in FIG. 8.

The flow quantization error for each node n may be defined by $$e_n = \max_{p \in P_n} \left| \frac{u_{np}}{M} - f_{np} \right|.$$

With larger M, better approximation can be obtained and therefore smaller error can also be obtained. An error upper bound may also be specified, and the minimum number of trees, $M$, may be found such that the maximum flow approximation error among all the nodes, $\max(e_n)$, is smaller than the error upper bound. It is shown hereinbelow that the number of trees required to get close to the optimal case is typically small.

The next step is to construct the set of trees based on the link usages $u_{np}$. The set of trees may be formed by creating an N×M table, as illustrated in FIG. 9, such that each row of the table corresponds to a node and each column of the table corresponds to a data collection cycle, or to a tree. The element in the ith row and the jth column is the parent of node i at cycle j.

The elements of the N×M table may be filled row by row such that parent p appears exactly $u_{np}$ times in row n. As long as the number of appearances of each node p in row n satisfies the usages values of $u_{np}$, the order of the elements in a row can be arbitrarily selected, and the same approximation to the optimal flow rates can be obtained.

The network in FIG. 4d may be used as an example to demonstrate how to fill the elements in the table. Given the $f_{ij}$ and M=8, $u_{ij}$ may be calculated for all links and the following may be obtained:

$(u_{41}=3, u_{42}=5), (u_{61}=2, u_{64}=6)$ $(u_{51}=1, u_{52}=1, u_{53}=6).$

Because nodes 1, 2 and 3 are connected to the base station, the base station will be the parent of each of nodes 1, 2 and 3 in all cycles. Thus, the value 0, indicating the base station, is filled in rows 1, 2 and 3. For node 4 it is known that, during the eight cycles, node 1 should be chosen as its parent three times ($u_{41}=3$) and node 2 should be chosen as its parent five times ($u_{42}=5$). Thus, three 1's and five 2's are entered into the fourth row of the table. Using the same method to fill the rows 5 and 6, Table 1 as shown in FIG. 9 is obtained as the final tree table.

Each column in the Table 1 of FIG. 9 corresponds to a tree. Since the element order in each row can change arbitrary, we can create different sets of trees from the same link usages $u_{ij}$. Any such set of trees will give the same approximation to the optimal flow rates and therefore will have the same average energy consumption. Thus, in terms of energy-efficiency, the sets of trees are all equivalent. However, the set which satisfies additional properties may be found to help with the scheduling process. Scheduling a node with many children requires more time slots, so it is desirable to find the set of the trees for which the maximum number of children in each tree is small across all the trees. The elements in each row in the tree table may be shuffled to reduce the maximum number of children.

The collision-free scheduling process will now be described in more detail. For each tree, each of which corresponds to a respective column in the tree table, a collision-free schedule list may be created. Each element in the list is a four-tuple, i.e., has four variables (s, R, t, f), which specify that sender s can transmit to receivers r in R in time slot t using frequency channel f. The algorithm adds elements (s, R, t, f) one after another to the schedule list based on a greedy scheme, sometimes referred to as a "greedy algorithm." The algorithm starts from the first time slot and frequency channel, and tries to add as many schedules in the current time slot using the current frequency channel. If no new schedule can be added, the algorithm moves to the next channel and once it goes through all the channels, it moves to the next time slot.

When adding a schedule (s, R, t, f), the algorithm checks three conditions to ensure that the schedules are collision-free. A first of the conditions is that sender s and all receivers r in R are not already scheduled in the current time slot t. A second of the conditions is that no node in the interference range of sender s is scheduled to receive in time slot t and channel f. A third of the conditions is that no node in the interference range from any of receivers r in R is scheduled to send in slot t and channel f.

Figure 10:
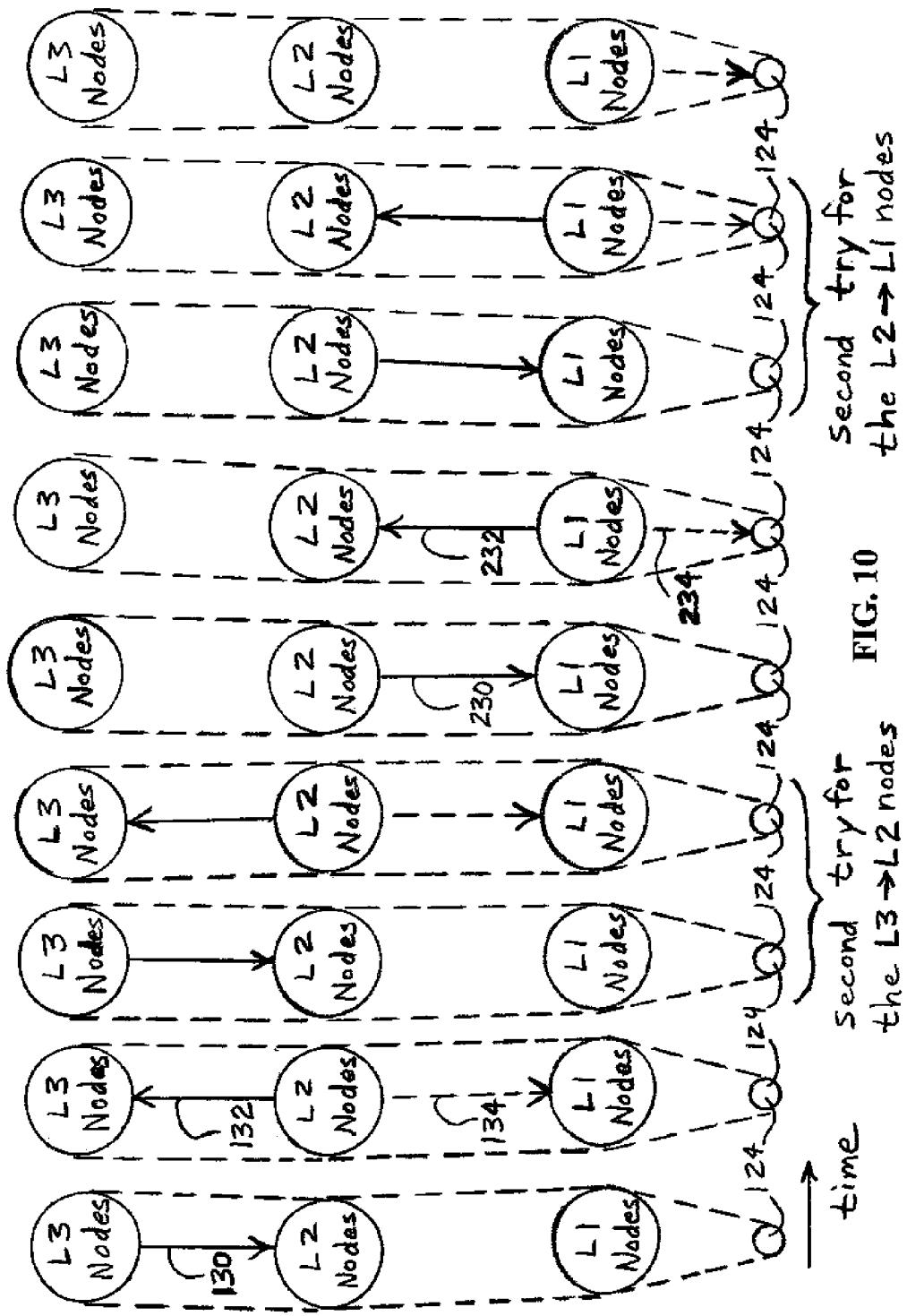
FIG. 10 is a schematic diagram of a scheduling order according to a method of the present invention.

The sender/receivers and the order in which the nodes are scheduled are determined by the packet exchange procedure and the acknowledgment mechanism. FIG. 10 illustrates the schedule order for a network with three layers assuming employment of the third scheme described above in which the acknowledgment packet sent to the children is combined with the packet that the parent node sends to its parent. The first step is to schedule all the nodes in layer three to send their messages to their parents in layer two, as indicated by arrow 130. Note that this step may take many time slots. Next, all the layer two nodes are scheduled to send a combined acknowledgement signal to their children nodes and parent node, as indicated by arrows 132, 134, respectively. In a next step, the second try, i.e., retry, slots are arranged. In these second tries, the calculated schedules are repeated to create the retry opportunity. FIG. 10 shows only two rounds of schedules for each layer, but this can be increased to any number of rounds by repeating the same schedules multiple times.

A similar procedure is repeated to calculate the schedule for next layers L2 and L1. Specifically, all the nodes in layer two are scheduled to send their messages to their parents in layer one, as indicated by arrow 230. Next, all the layer one nodes are scheduled to send a combined acknowledgement signal to their children nodes and parent node, as indicated by arrows 232, 234, respectively. In this case, the parent node may be a base station 124. Layer two nodes that do not have any child node may use this part of the schedule to send their messages to their parent nodes in layer one. The other layer two nodes have already sent the message packets to their parent nodes, combined with the acknowledgement signals, in the previous round when sending the acknowledgement signals to their children, as indicated at 132 and 134. In a next step, the second try, i.e., retry, slots are arranged.

Generally, the child node sends its packet in the assigned time slot to its parent node. Next, the child node expects and listens for the acknowledgement signal from the parent node in the assigned time slot. If the acknowledgement signal indicates that the parent node received the packet correctly, then the child stops. Otherwise, if the acknowledgment signal is missing or if the acknowledgement signal indicates that the parent node did not receive the packet correctly, then the child nodes tries again to transmit the message packet in the next pre-assigned retry time slot.

The parent node may need to know that the child node has received the acknowledgement signal packet correctly. If a child node does not receive the acknowledgement signal in the previous round and tries to send the message again, the parent node preferably does not ignore the child node and preferably replies back with another acknowledgement signal. Thus, after the parent node receives the message successfully from the child node and sends the acknowledgement signal, in the next retry slots for the same child node, the parent nodes may go into the receive mode for a short period of time and may sample the signal level on the channel. If the parent node senses a high signal, then the parent node may assume that the child node is trying to send the message again. Because the parent node has already received the message from the child node, the parent node sends another acknowledgement signal in the next acknowledgement time slot. The parent node may consume much less energy in sampling the signal level than in receiving the whole packet. The parent node may stop sending acknowledgement signals when no high signal is detected in any of its children node's retry time slots.

Computer simulations of the method of the present invention are now described in order to illustrate the performance of the present invention. Random geometric graphs may be used in the simulations in order to model the connectivity graph of sensor network deployments. The number of nodes is denoted by N. Instead of positioning the N nodes randomly, a more realistic "randomized grid" model may be use. First, the node may be formed in a deterministic order on a grid such that each row has approximately (N^0.5) nodes with equal distance between any two adjacent nodes. Next, the grid may be randomized by moving each node from its original position by a random distance in both x and y directions. The random shift may be a uniform random variable between zero and a parameter that is a times the original distance between two adjacent nodes.

Figure 11:
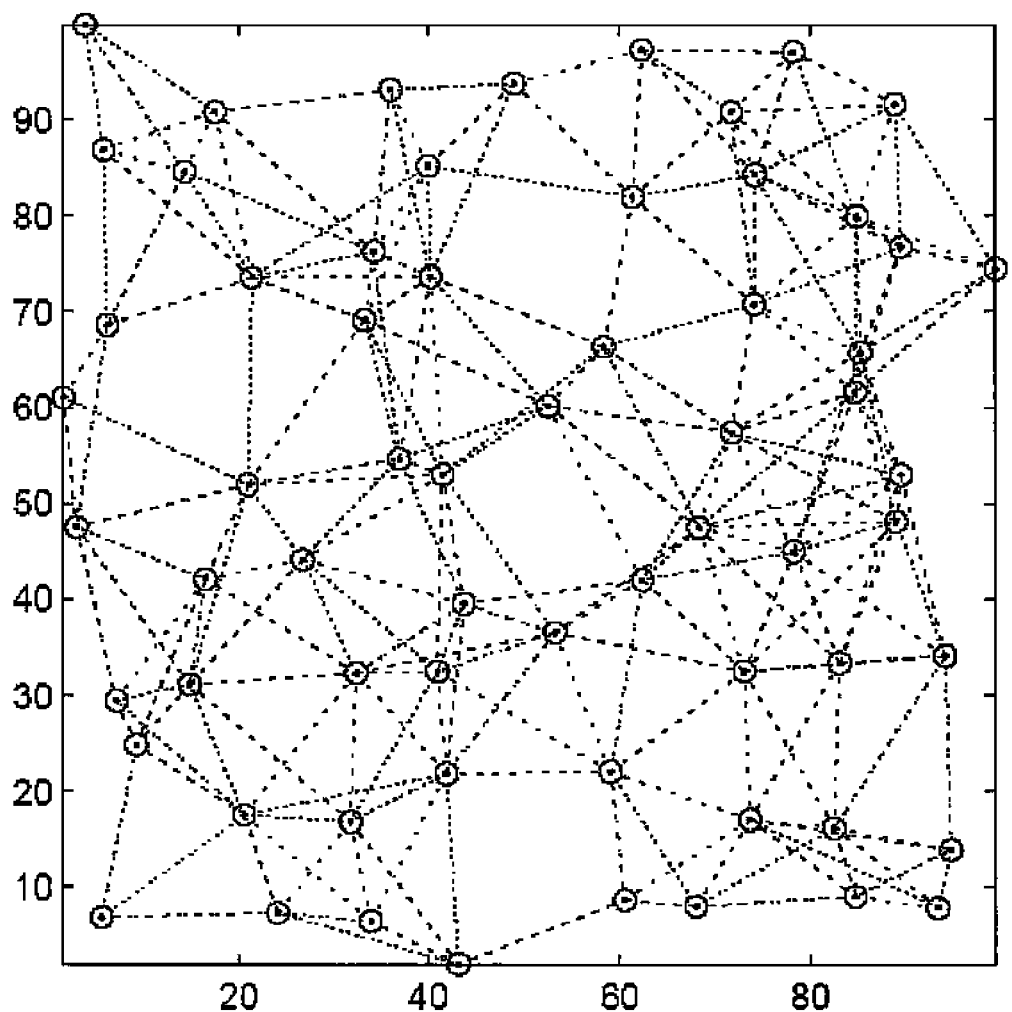
FIG. 11 is one embodiment of a random geometric graph for a simulation to model the connectivity graph of sensor network deployments according to a method of the present invention.

To form the connectivity graph, a communication range is defined and any two nodes in the random grid that are within the communication range are assumed to be able to communicate with each other. The number of neighbors of a node may be defined as the number of nodes that can communicate with that node. To quantify the density of a connectivity graph, the parameter n may be used to denote the average number of neighbors over all the nodes in a network. Larger value for n implies a denser network. A random graph is shown in FIG. 11 with the parameters: N=64, n=10, and a=0.9.

Figure 12:
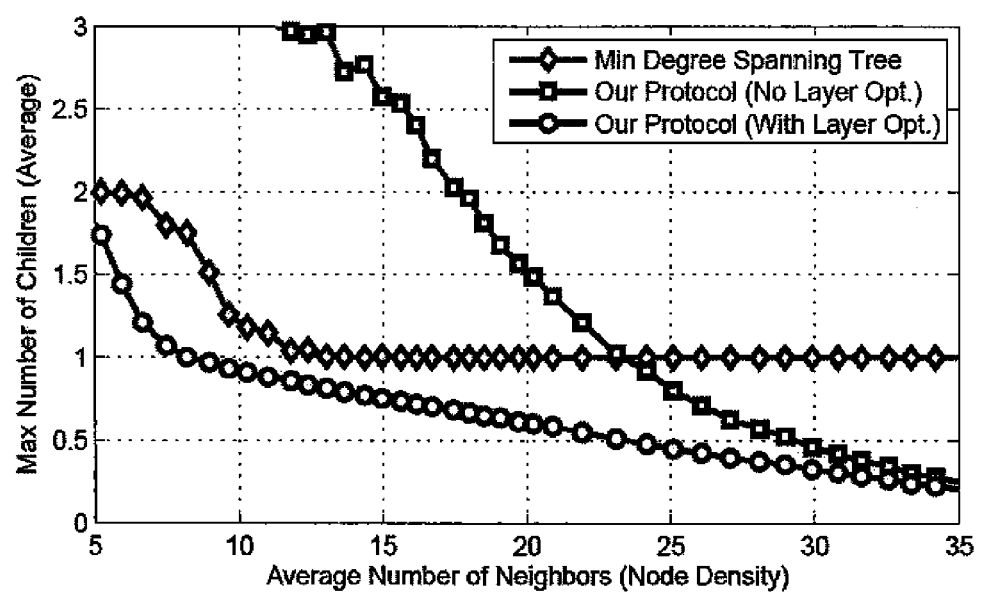
FIG. 12 is a plot, for three different scenarios, of the maximum number of children versus network density for a network having sixty-four nodes according to one embodiment of the present invention.

A simulation of layer assignment and flow optimization may be conducted over many instances of random graphs with N=64 and different network densities with average number of neighbors in the range of $5 \leq n \leq 35$. The results of such a simulation are shown in FIG. 12. Three plots are included in the graph of FIG. 12. The first plot is of the minimum degree spanning tree (MDST), which is displayed in FIG. 12 with diamond-shaped markers at the data points. This plot represents the tree with the minimum number of children assigned to each node, and is essentially the most balanced and energy-efficient tree that can be used if it is assumed that the communication tree does not change over time. The MDST curve shows the maximum number of children of MDST averaged over all graph instances, i.e., averaged over many connectivity graphs.

The method of the present invention may be used to solve the flow optimization problem with and without the layer assignment step to get $f_{max}$ which represents the maximum number of children. The plots with circular and square-shaped markers respectively show the results for the cases with and without the layer assignment step.

The method of the present invention may generate a more balanced solution with fewer children, or even fractions of a child, being assigned to each node. It can be seen that the MDST saturates to, at most, one child per node for higher node densities, while the method of the present invention is not limited and its performance improves as the network becomes denser. FIG. 12 also illustrates the benefit of the layer assignment step. Without the layer assignment step, the performance may be significantly degraded.

Figure 13:
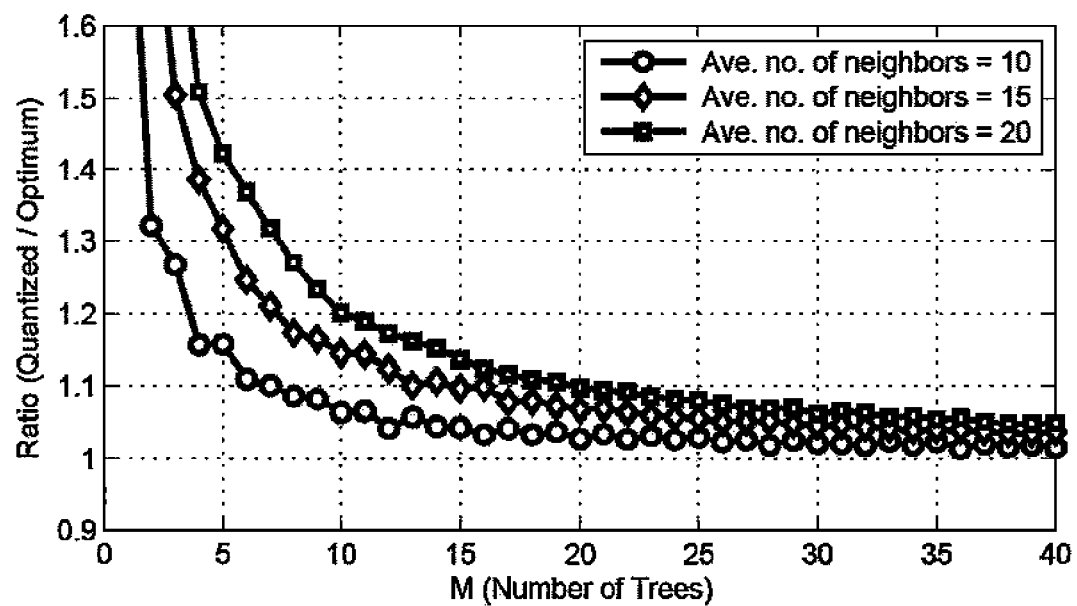
FIG. 13 is a plot, for three different scenarios, of the ratio of the quantized load to the optimum load versus the number of network trees according to one embodiment of the present invention.

After calculating the flows, a set of trees may be generated to approximate the optimal flows. A different set of simulations may be performed to determine how many trees are needed in order to have a good approximation that is close to optimal values. FIG. 13 shows the effect of the number of trees. The ratio of the quantized load. i.e., the maximum number of children, to the optimum load is plotted for different number of trees (M). The results are averaged over many instances of random connectivity networks with N=64 nodes and the average number of neighbors (n) is set to 10, 15, and 20. The horizontal axis shows the number of trees (M). The vertical axis shows the ratio of maximum load, e.g., maximum number of children, after finding the best set of M trees to the optimum load from the LP solution. A ratio of 1.1 indicates that there is 10% increase in the load value due to the limited number of trees being used. Each value in the graph is averaged over many instances of random connectivity networks with N=64 nodes and the average number of neighbors (n) being set to 10, 15, and 20. As expected, with more trees it is possible to obtain a better approximation. Also, with more than twenty-five trees, it is possible to obtain results that are very close to the optimum value.

Figure 14:
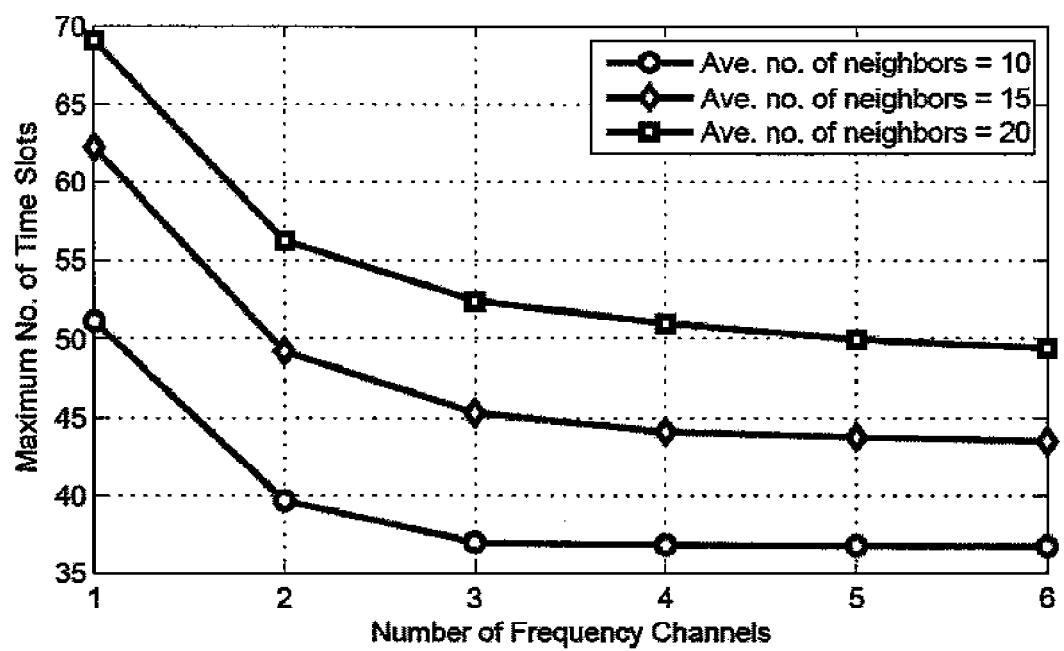
FIG. 14 is a plot, for three different scenarios, of the maximum number of time slots versus the number of frequency channels according to one embodiment of the present invention.

Simulations may also be conducted to compute the number of time slots required to schedule one data collection, i.e., supervision, cycle. FIG. 14 illustrates the saturation effect of the number of channels. The maximum number of time slots required to schedule all nodes averaged over many connectivity graphs is plotted versus the number of frequency channels. The network size is N=64 nodes with different node densities (n=10, 15, and 20). The maximum number of slots is calculated over all trees. From FIG. 14 it can be verified that more time slots are needed, on average, for a denser network. This is as expected because in a denser network more nodes can interfere with one another, and therefore more time slots are used to create a collision-free schedule. With more frequency channels fewer time slots are required, but it saturates soon. With only three frequency channels, the system is already very close to the saturation point.

From the simulation results it can be concluded that, on average, between thirty and seventy time slots are needed to schedule all nodes for one round. One time slot represents the time it takes to send/receive one packet. So, depending on the data rate, one time slot can be between hundreds of microseconds to tens of milliseconds in duration. The data collection (supervision) period is typically tens or hundreds of seconds, so there can be hundreds to thousands of time slots in one data collection cycle. Thus, many rounds and many retries can be accommodated to increase the reliability significantly.

Figure 15:
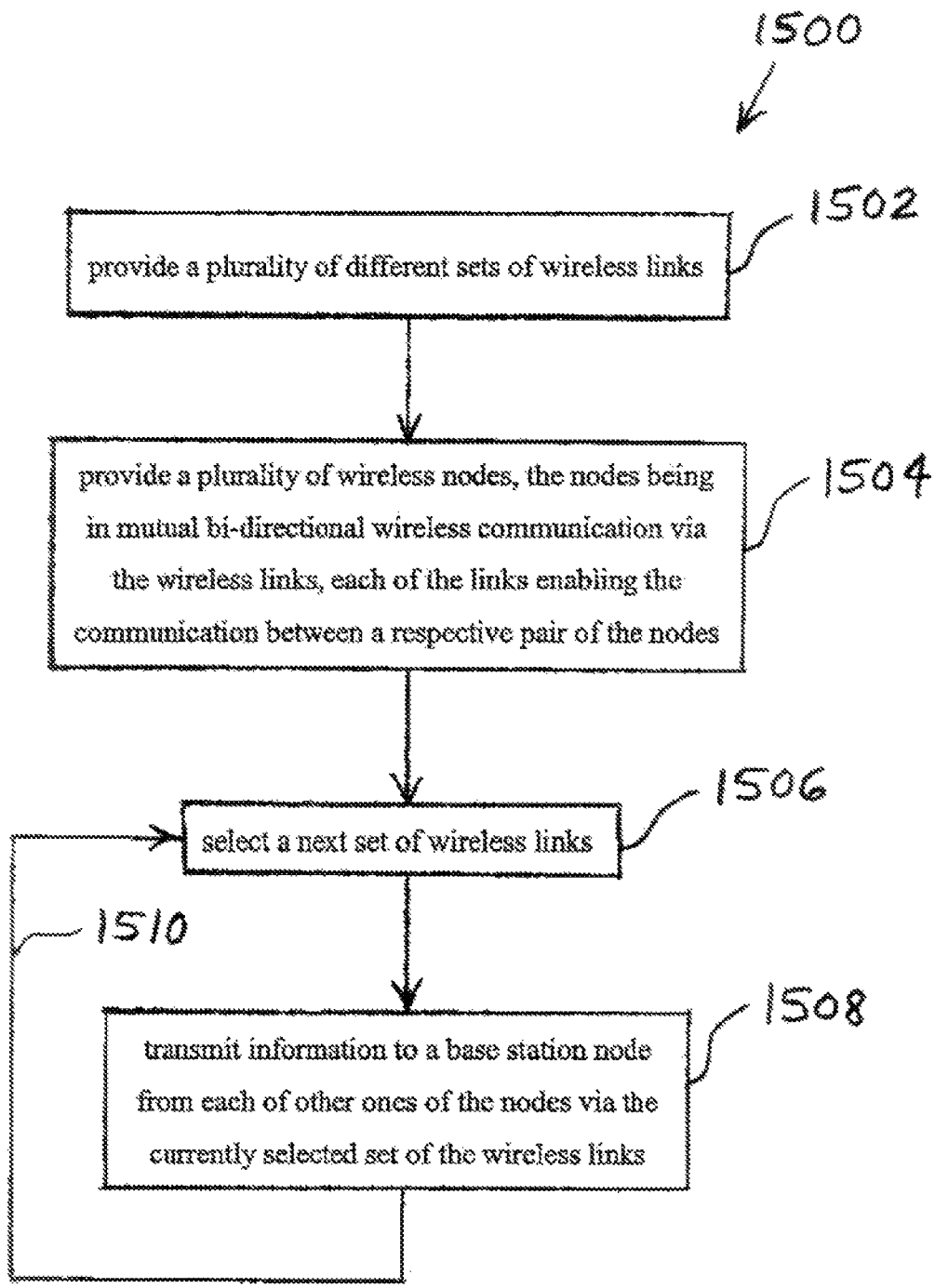
FIG. 15 is a flow chart illustrating one embodiment of a wireless networking method of the present invention.

An embodiment of a wireless networking method 1500 of the present invention is illustrated in FIG. 15. In a first step 1502, a plurality of different sets of wireless links are provided. For example, in the embodiment of FIGS. 5a-h, a plurality of network trees are provided, and each network tree is formed of a respective set of wireless links.

In a next step 1504, a plurality of wireless nodes are provided, the nodes being in mutual bi-directional wireless communication via the wireless links, each of the links enabling the communication between a respective pair of the nodes. In FIG. 4a, nodes 0-6 are provided. Each of nodes 0-6 can engage in two-way communication with at least two other nodes via the wireless links that interconnect the nodes. That is, each of the links enables a respective pair of the nodes to communicate with each other.

Next, in step 1506, information is transmitted to a selected one of the nodes from each of other ones of the nodes via a first of the sets of the wireless links. As illustrated in FIG. 5a, information is transmitted to base station node 0 from each of nodes 1-6 via a first set of wireless links in the form of a network tree.

In a final step 1508, the step of transmitting information to the selected one of the nodes from each of other ones of the nodes is repeated, via each of other ones of the sets of the wireless links, respectively. That is, as shown in FIGS. 5b-d, information is transmitted to base station node 0 from each of nodes 1-6 via three additional network trees, in turn.

Further, as shown in FIGS. 5a-h, use of individual ones of the sets of wireless links may be consecutively repeated in transmitting the information. Specifically, the same network tree is consecutively and repeatedly used in cycles 4-8. At the completion of cycle 8, use of the group of cycles 1-8, i.e., steps 1506, 1508, may be repeated indefinitely, as indicated by arrow 1510, in the transmission of information from nodes 1-6 to node 0. Thus, in the overall long-term scheme, the network tree that is used in cycles 4-8 is used more frequently than any of the network trees used in cycles 1-3. The respective frequencies of use of each of the network trees may be determined based upon the calculated fractions. The network trees represent different communication paths that may be alternatingly used to transmit signals from the child nodes to the parent nodes. The sets of wireless links that are used in cycles 1-8 may be selected such that each of parent nodes 1-3 receives an approximately equal number of the transmissions of the information from child nodes 4-6.

Figure 16:
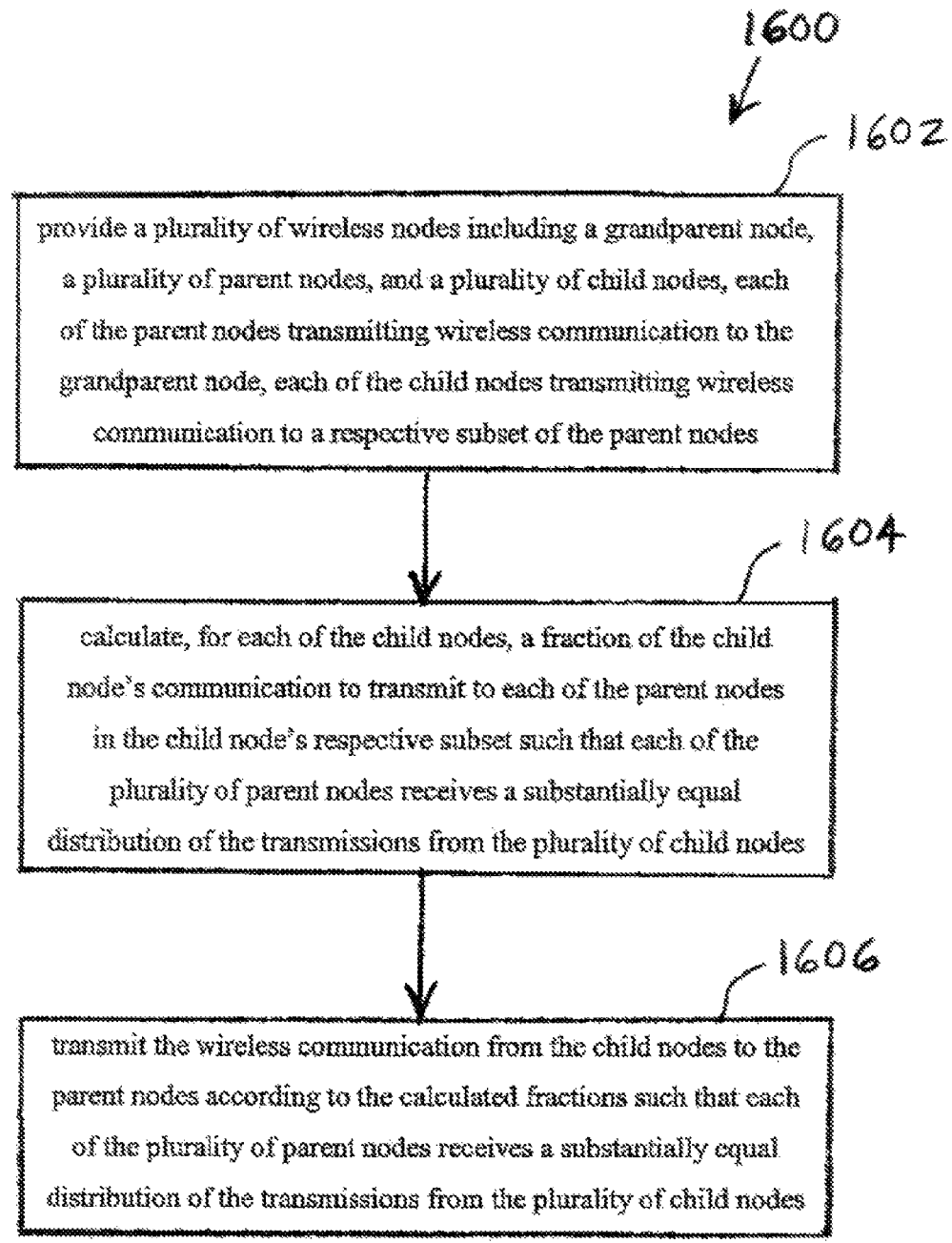
FIG. 16 is a flow chart illustrating another embodiment of a wireless networking method of the present invention.

Another embodiment of a wireless networking method 1600 of the present invention is illustrated in FIG. 16. In a first step 1602, a plurality of wireless nodes including a grandparent node, a plurality of parent nodes, and a plurality of child nodes are provided, each of the parent nodes transmitting wireless communication to the grandparent node, each of the child nodes transmitting wireless communication to a respective subset of the parent nodes. For example, in FIG. 4a, wireless nodes are provided including a grandparent node 0, parent nodes 1-3, and child nodes 4-6. Each of parent nodes 1-3 transmits wireless communication to grandparent node 0. Child node 4 transmits wireless communication to parent nodes 1 and 2; child node 5 transmits wireless communication to parent nodes 1-3; and child node 6 transmits wireless communication to parent node 1.

In a next step 1604, for each of the child nodes, fractions of the child node's communication to transmit to each of the respective parent nodes in the child node's respective subset are calculated such that each of the plurality of parent nodes receives a substantially equal distribution of the transmissions from the plurality of child nodes. As shown in FIG. 4d, fractions of the communication of child nodes 4-6 to transmit to each of the child nodes' parent nodes are calculated. That is, ¼ of the communication of child node 6 is transmitted to parent node 1, and the other ¾ is transmitted to child node 4. The communication of child node 4 is divided ⅜ to parent node 1 and ⅝ to parent node 2. The communication of child node 5 is divided ⅛ to parent node 1, ⅛ to parent node 2, and ¾ to parent node 3. Thus, each of parent nodes 1-3 receives, on average, ¾ of the communication of a child node. That is, parent node 1 receives ¼ of node 6, plus ⅜ of node 4, plus ⅛ of node 5. Similarly, parent node 2 receives 5/8 of node 4 and 1/8 of node 5 for a total of 3/4. Likewise, parent node 3 receives 3/4 of node 5.

In a final step 1606, the wireless communication from the child nodes to the parent nodes is transmitted according to the calculated fractions such that each of the plurality of parent nodes receives the substantially equal distribution of the transmissions from the plurality of child nodes. The network trees in FIGS. 5a-h may be selected based upon the calculated fractions of FIG. 4d. Child nodes 4-6 may transmit wireless communication to parent nodes 1-3 in cycles 1-8 by use of the eight network trees, respectively.

Figure 17:
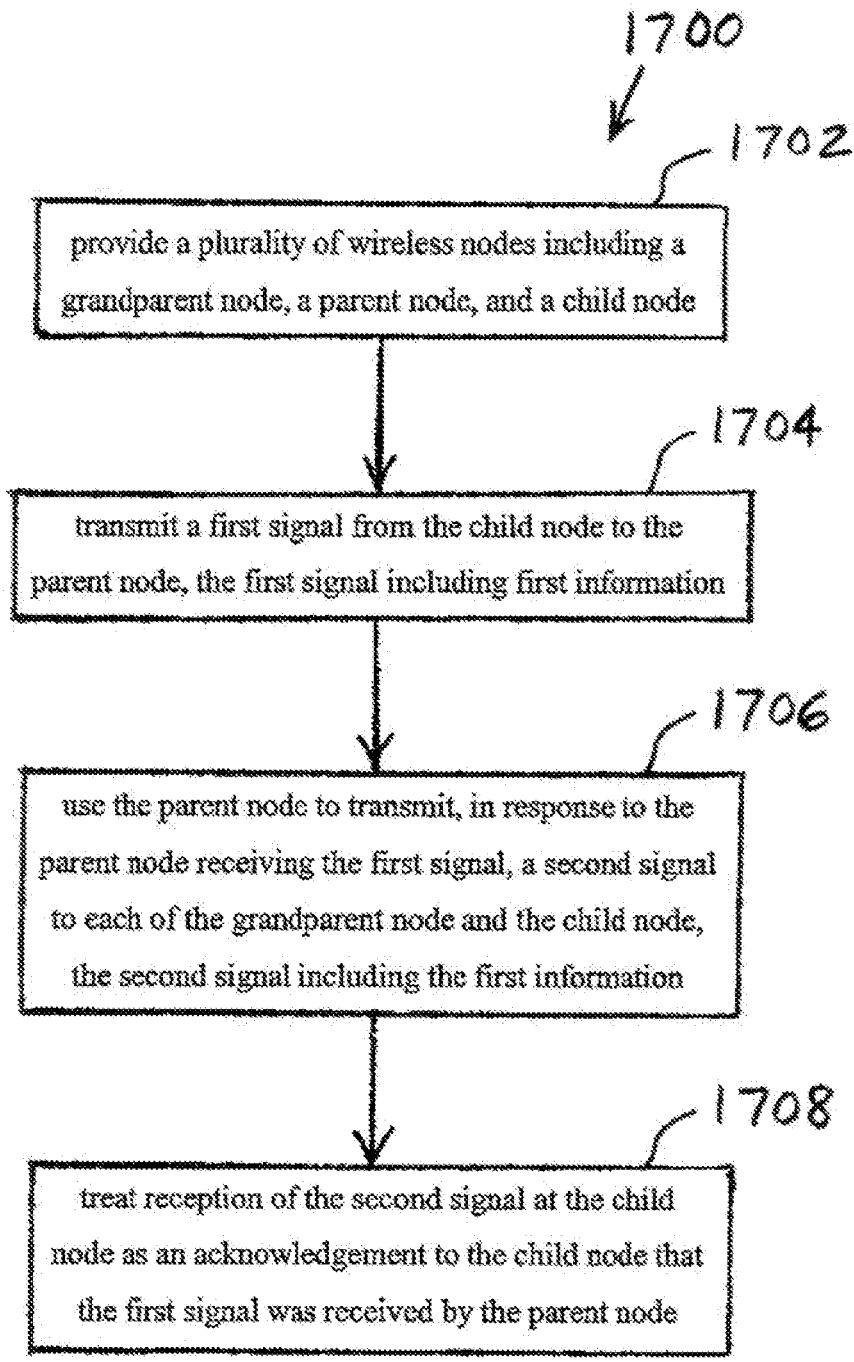
FIG. 17 is a flow chart illustrating yet another embodiment of a wireless networking method of the present invention.

Yet another embodiment of a wireless networking method 1700 of the present invention is illustrated in FIG. 17. In a first step 1702, a plurality of wireless nodes including a grandparent node, a parent node, and a child node are provided. For example, in FIGS. 2a-b, wireless nodes are provided including a grandpa node, a parent node, and three child nodes.

In a next step 1704, a first signal is transmitted from the child node to the parent node, the first signal including information. As indicated by arrows 1-3 in FIG. 2a, signals are transmitted from each of the children nodes to the parent node, and the signals may include information.

Next, in step 1706, the parent node is used to transmit, in response to the parent node receiving the first signal, a second signal to each of the grandparent node and the child node, the second signal including the information. As indicated by the four arrows in FIG. 2b, the parent node transmits, in response to the parent node receiving the signals in FIG. 2a, a same second signal to each of the grandpa node and the three children nodes. This second signal may also include the information that was transmitted from the children nodes to the parent node in FIG. 2a. The second signal may include at least one bit that both is included in the information and serves as at least a portion of an acknowledgement signal to the child node that the first signal was received by the parent node.

In a final step 1708, reception of the second signal at the child node is treated as an acknowledgement signal to the child node that the first signal was received by the parent node. That is, in response to receiving the signal from the parent node, the children nodes may refrain from resending the same signals that the children nodes transmitted in FIG. 2a. However, if the children nodes do not receive the signal from the parent node within a predetermined time period, then the children nodes may assume that the parent node may not have received the signals that the children nodes transmitted in FIG. 2a. Hence, the children nodes may retransmit the signals that the children nodes transmitted in FIG. 2a.

A collision-free scheduling algorithm for supervision or data collection in a wireless sensor network may be provided by the present invention. The energy consumption rate can be reduced by minimizing the average number of children nodes. Then, by making the network topology dynamic, the near-optimal network lifetime can be achieved. A novel packet exchange procedure may reduce or minimize the number of exchanged packets. With the scheduling method of the present invention, energy-efficiency may be improved by avoiding any collisions. Many time slots can be used for re-transmissions and therefore the reliability can be improved. Simulations can be conducted to verify the benefits of the methods of the present invention.

While this invention has been described as having an exemplary design, the present invention may be further modified within the spirit and scope of this disclosure. This application is therefore intended to cover any variations, uses, or adaptations of the invention using its general principles.

What is claimed is:

1. A wireless networking method, comprising the steps of:
providing a plurality of different sets of wireless links;
providing a plurality of wireless nodes, the nodes being in mutual bi-directional wireless communication via the wireless links, each of the links enabling the communication between a respective pair of the nodes;
transmitting information to a selected one of the nodes from each of other ones of the nodes via a first of the sets of the wireless links, the transmitting step including:
transmitting a first signal from one of the child nodes to one of the parent nodes, the first signal including first information; and
transmitting a second signal from the one parent node to the selected one of the nodes and to the one child node, the second signal including the first information;
repeating, via cyclical use of each of other ones of the sets of the wireless links, respectively, the step of transmitting information to the selected one of the nodes from each of other ones of the nodes, the other ones of the nodes including parent nodes and child nodes; and
selecting the different sets of wireless links such that each of the parent nodes receives an approximately equal number of the transmissions of the information from the child nodes.

2. The method of claim 1 comprising the further step of repeating indefinitely the transmitting and repeating steps.

3. The method of claim 1 wherein the selected one of the nodes comprises a base station node.

4. The method of claim 1 wherein the transmitting step includes using more than one frequency channel.

5. The method of claim 1 wherein at least one of the sets of wireless links is used more frequently than at least one other one of the sets of wireless links in transmitting the information.

6. A wireless networking method, comprising the steps of:
providing a plurality of wireless nodes including a grandparent node, a parent node, and a child node;
transmitting a first signal from the child node to the parent node, the first signal including information;
using the parent node to transmit, in response to the parent node receiving the first signal, a second signal to each of the grandparent node and the child node, the second signal including the information; and
treating reception of the second signal at the child node as an acknowledgement signal to the child node that the first signal was received by the parent node.

7. The method of claim 6 wherein the second signal includes at least one bit that both is included in the information and serves as at least a portion of an acknowledgement signal to the child node that the first signal was received by the parent node.

8. The method of claim 6 wherein the providing step includes providing a plurality of parent nodes and a plurality of child nodes, the method comprising the further step of transmitting a plurality of signals from the child nodes to the parent nodes via alternatingly used communication paths.

9. The method of claim 8 comprising the further step of selecting the alternating communication paths such that each of the parent nodes receives an approximately equal number of the plurality of signals.

10. The method of claim 8 wherein the step of transmitting a plurality of signals from the child nodes to the parent nodes includes using a plurality of frequency channels.

11. The method of claim 8 wherein at least one of the communication paths is used more frequently than at least one other one of the communication paths.

\* \* \* \* \*